United States Patent
Sana et al.

(10) Patent No.: US 7,141,199 B2
(45) Date of Patent: Nov. 28, 2006

(54) METHOD AND APPARATUS FOR SHAPING SECTION BAR MADE OF COMPOSITE MATERIAL AND SHAPED PRODUCT AND I-SHAPED STRINGER THEREOF

(75) Inventors: Toshikazu Sana, Kakamigahara (JP); Makoto Sato, Kakamigahara (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 130 days.

(21) Appl. No.: 10/856,549

(22) Filed: May 28, 2004

(65) Prior Publication Data

US 2004/0265536 A1    Dec. 30, 2004

(30) Foreign Application Priority Data

May 30, 2003    (JP)    ............................. 2003-155387

(51) Int. Cl.
*B29C 43/20*    (2006.01)
*B29C 70/46*    (2006.01)

(52) U.S. Cl. ....................... 264/255; 264/257; 264/258; 264/292; 264/294; 264/295; 264/296; 264/324

(58) Field of Classification Search ........ 264/257–258, 264/255, 292, 324, 294, 295, 296
See application file for complete search history.

(56) References Cited

U.S. PATENT DOCUMENTS

| | | | |
|---|---|---|---|
| 3,838,590 A | 10/1974 | Van Dijk | |
| 5,096,525 A | 3/1992 | Engwall | |
| 5,538,589 A | 7/1996 | Jensen et al. | |
| 6,569,371 B1 * | 5/2003 | Asari et al. | .................. 264/231 |
| 6,783,718 B1 * | 8/2004 | Blanchon et al. | ........... 264/257 |
| 6,814,916 B1 * | 11/2004 | Willden et al. | .............. 264/257 |
| 6,890,470 B1 * | 5/2005 | Staub et al. | ................. 264/255 |

FOREIGN PATENT DOCUMENTS

| | | |
|---|---|---|
| JP | 62-207637 | 9/1987 |
| JP | 04-299110 | 10/1992 |
| JP | 05-042590 | 2/1993 |
| JP | 08-025386 | 1/1996 |
| JP | 08-085159 | 4/1996 |
| JP | 2003-053851 | 2/2003 |
| JP | 2004-351882 | 12/2004 |

* cited by examiner

*Primary Examiner*—Stefan Staicovici
(74) *Attorney, Agent, or Firm*—Alleman Hall McCoy; Russell & Tuttle LLP

(57) ABSTRACT

A method and apparatus for shaping a section bar (for example, a "T-shaped" or "J-shaped" stringer) made of composite material is provided. The method comprising the steps of placing the stacked reinforced-fiber sheets on a pair of side presses opposing to each other with a predetermined gap; inserting a punch through the gap from above to fold the stacked reinforced-fiber sheets in half, while holding ends of the stacked reinforced-fiber sheets between upper surfaces of the side presses by block members; drawing out the punch upward and then pressing the stacked reinforced-fiber sheets folded by the side presses therebetween. A shaped product shaped thereby is high quality in which a distortion ("fluctuation") of the stacked reinforced-fiber sheets in the inner side ply or plies of bending does not occur and ends of the stacked reinforced-fiber sheets are aligned between plies.

5 Claims, 10 Drawing Sheets

METHOD AND APPARATUS FOR SHAPING SECTION BAR MADE OF COMPOSITE MATERIAL AND SHAPED PRODUCT AND I-SHAPED STRINGER THEREOF

TECHNICAL FIELD

The present invention relates to a skin-stringer structure having a surface-plate portion made of composite material, and a reinforcement portion made of composite material provided on a one-side-surface of the surface-plate portion and extended to one direction along the surface-plate portion. Especially, the present invention relates to a method of shaping such stringer, an apparatus used for that shaping, and a stringer as a shaped product.

BACKGROUND OF THE INVENTION

In recent years, the rate of use of a skin-stringer structure made of composite material as a shell panel of a fuselage or wings of an airplane has increased. A forming cost of the stringer occupies about 64% of the whole manufacturing cost of the shell panel.

As shown in FIG. 1, a skin-stringer structure 1 or a shell panel made of composite material typically comprises a board-shaped skin 2 which is located on the outer fuselage and painted on an outside surface thereof, and one or more stringers 3 which are attached to an inner surface of the skin 2. For example, the skin 2 is of a plane or curved board made from a plurality of reinforced-fiber sheets stacked one another. Each reinforced-fiber sheet is typically formed such that a large number of reinforced fibers (for example, carbon fibers) are all arranged in one direction (also referred to as "UD" or "Uni-Direction") to form a sheet shape, and soaked in synthetic resin, such as heat-hardening resin. A desired number of the stacked reinforced-fiber sheets are then stacked to have a desired thickness while they are shaped in a desired shape and then hardened by heat to form an integral plate to be utilized as a part of a shell plate or a skin of an airplane. Similarly, each stringer 3 is formed such that a desired number of the stacked reinforced-fiber sheets are stacked to have a desired thickness and then bent along the direction of the reinforced fibers (typically, along the longitudinal direction of the stacked reinforced-fiber sheets) to form a desired stringer shape. Typically, the stringers 3 are attached to the skin 2 before heating for hardening and, thus, the stringers 3 and the skin 2 are hardened together. Accordingly, each stringer 3 functions as a reinforcement structure for strengthening a skin 2 to resist a stress produced by a twist acting on the skin 2 or a pressure acting on the skin surface.

Typically, many of the skin-stringer structures 1 are made of composite material, such as prepreg, and, generally, as described above, the skin 2 and the stringer 3 are constructed with stacked prepreg sheets.

Conventionally, as disclosed in Japanese Patent Publication No. 2954836, as a typical cross-sectional shape of the stringer 3, a "T-shape" as shown in FIG. 2A or a "J-shape" as shown in FIG. 2B have been adopted (they are shown as inverted shapes in those figures). The T-shape is formed such that belt-shaped stacked prepreg sheets are folded in half to form a web portion 32 of the stringer, and then both open ends are equally bent to opposite directions by 90 degrees to form base-end flange portions 31 of the stringer (lowermost end in the figure) with lower surfaces thereof being attached to the skin 2. On the other hand, the J-shape is formed such that, similarly to the T-shape, belt-shaped stacked prepreg sheets are folded in half to form a web portion 32 of the stringer and then both open ends are equally bent to opposite directions by 90 degrees to form base-end flange portions 31 of the stringer (lowermost end in the figure) with lower surfaces thereof being attached to the skin 2, while a closed or looped end is bent in one direction by 90 degrees to form a tip-end flange portion 33 of the stringer (uppermost end in the figure). Therefore, when applying stacked prepreg sheets of 8 plies, each of the base-end flange portions 31 has a thickness of 8 plies and, the web portion 32 and the tip-end flange portion(s) 33 have a doubled thickness of 16 plies because they are folded in half.

Next, a conventional shaping method of the T-shaped and J-shaped stringers will be explained in detail, referring to FIGS. 3A through 3D and FIGS. 4A through 4D, respectively.

First, in forming the T-shaped stringer, as shown in FIG. 3A, stacked prepreg sheets P of two or more plies before hardening treatment are placed on upper surfaces of a pair of side presses 4. The side presses 4 are press machines extended in the longitudinal direction of the stacked prepreg sheets P (i.e., in the front-and-rear direction which is perpendicular to the drawing sheet) to cover the entire length of the stacked prepreg sheets P, and arranged opposing each other so as to be able to press the stacked prepreg sheets P between mold portions corresponding to a stringer shape, provided at opposing ends of the side presses 4. The side presses 4 are spaced apart by a predetermined gap larger than a thickness of a web portion of the stringer to be yielded. A punch 5 is disposed above the mold portions of the side presses 4 so as to move vertically between the mold portions. The punch 5 also extends in the longitudinal direction of the stacked prepreg sheets P (i.e., in the front-and-rear direction which is perpendicular to the drawing sheet) to cover the entire length of the stacked prepreg sheets P.

As shown in FIG. 3B, while the side presses 4 are maintaining the gap, the punch 5 moves downwardly and then pushes the stacked prepreg sheets P at the center in the width direction thereof (i.e., in the left-and-right direction of the drawing) to fold the stacked prepreg sheets P in half, with the punch 5 being pressed through the gap between the side presses 4. At the same time, a stopper 6, which is provided below the gap so as to move vertically, moves upwardly and then stops at lower surfaces of the side presses 4. Therefore, the stacked prepreg sheets P are stopped at an upper surface of the stopper 6, and are prevented from protruding downwardly from the lower surfaces of the side presses 4.

Then, as shown in FIG. 3C, the punch 5 is moved upwardly and extracted from the stacked prepreg sheets P which are folded in half. For this process, the punch 5 is formed so as to be enlarged at only a tip portion thereof and, thus, the punch 5 is hardly influenced of frictional resistance of the resin in the stacked prepreg sheets P which are sandwiching the punch 5. When the punch 5 is extracted, the side presses 4 press the half-folded stacked prepreg sheets P by a predetermined pressing force to form a web portion of the stringer with a doubled thickness (i.e., a doubled number of plies) of the original stacked prepreg sheets P.

Furthermore, as shown in FIG. 3D, a roller 7 is inserted between open ends of the half-folded stacked prepreg sheets P from above, which protrude upwardly from the upper surfaces of the side presses 4. The roller 7 spreads the open ends of the stacked prepreg sheets P to the left and right, respectively, and presses them between the upper surfaces of the side presses 4 and, therefore, forms a T-shaped stringer.

Next, in forming the J-shaped stringer, as shown in FIG. 4A, stacked prepreg sheets P of two or more plies before hardening treatment are placed on upper surfaces of a pair of side presses 4.

Subsequently, as shown in FIG. 4B, while the side presses 4 are maintaining the gap, the punch 5 moves downwardly and then pushes the stacked prepreg sheets P at the center in the width direction thereof (i.e., in the left-and-right direction of the drawing) to fold the stacked prepreg sheets P in half, as the punch 5 being pressed through the gap between the side presses 4. At the same time, a stopper 6, which is provided below the gap so as to move vertically, moves upwardly and then stops at a position spaced apart from the lower surfaces of the side presses 4 by a predetermined distance. Therefore, the stacked prepreg sheets P are stopped at an upper surface of the stopper 6 with the lower end (closed or looped end) protruding downwardly from the lower surfaces of the side presses 4 at the predetermined distance.

Then, as shown in FIG. 4C, the punch 5 is moved upwardly and extracted from the stacked prepreg sheets P, which are folded in half. When the punch 5 is extracted, the side presses 4 press the half-folded stacked prepreg sheets P by a predetermined pressing force to form a web portion of the stringer with a doubled thickness (i.e., a doubled number of plies) of the original stacked prepreg sheets P.

Furthermore, as shown in FIG. 4D, a roller 7 is inserted between open ends of the half-folded stacked prepreg sheets P from above, which protrude upwardly from the upper surfaces of the side presses 4. The roller 7 spreads the open ends of the stacked prepreg sheets P to the left and right, respectively, and presses them between the upper surfaces of the side presses 4. In addition, another roller 8 traverses from left to right (or right to left) along the lower surfaces of the side presses 4 so that it bends the looped or closed end of the half-folded stacked prepreg sheets P to right while it presses the closed end between the lower surface of the right-side side press 4 and, therefore, forms a J-shaped stringer.

Stringers shaped by such processes described above are arranged with a pre-hardened skin in respective positions. Both the stringers and skin are then heat hardened together and, thus, a skin-stringer structure for a shell panel is produced.

When the prepreg sheets of two or more plies which constitute the stacked prepreg sheets P are bent once in the shaping processes, as shown in FIG. 5A, ends of the plies should slip past each other so as not to be aligned. However, when the stacked prepreg sheets P are further bent to the other direction, ends of the plies should come again in alignment. Such slippage is ideal when bending. However, in conventional stringer shaping method, as shown in FIG. 6A, when the stacked prepreg sheets P are bent once, the slippage does not occur due to a large frictional resistance of the resin in the prepreg sheets. Thus, a phenomenon in which inner ply or plies of the prepreg sheets for bending are distorted (also referred to as "fluctuation" herein) occurs. As shown in FIG. 6B, this "fluctuation" cannot be extended or corrected even if the prepreg sheets are forced to be bent to the other direction in this case because the prepreg sheets are pressurized and restricted between the side presses at a web portion thereof (see FIGS. 4C and 4D). Therefore, the prepreg sheets are hardened by heat with "the fluctuation" resided in the web portion thereof.

BRIEF SUMMARY OF THE INVENTION

A method and apparatus for shaping a section bar made of composite material is provided. According to one aspect of the invention, the method comprising the steps of: placing the stacked reinforced-fiber sheets on a pair of side presses opposing each other with a predetermined gap; inserting a punch through the gap from above to fold the stacked reinforced-fiber sheets while holding ends of the stacked reinforced-fiber sheets between upper surfaces of the side presses by block members; drawing out the punch upward and then pressing the stacked reinforced-fiber sheets folded by the side presses therebetween.

Before pressing a part of the stacked reinforced-fiber sheets to be a web portion of the stringer by the side presses, open ends of the stacked reinforced-fiber sheets are bent to the other directions, respectively, to form, for example, "base-end flange portions" to be coupled to a skin. Thus, a shaped product, such as "a T-shaped stringer," produced thereby is high in quality, in which a distortion ("fluctuation") of the stacked reinforced-fiber sheets in the inner side ply or plies of bending does not occur, and in which the ends of the stacked reinforced-fiber sheets are aligned between plies.

Further, in order to form a high quality "J-shaped" stringer, a looped end of the stacked reinforced-fiber sheets folded by a punch may protrude downwardly from lower surfaces of the side presses, and then the protruded looped end is bent to one direction by a roller which traverses to press the looped end between the lower surface of one of the side presses. In the present invention, folding and bending of the stacked reinforced-fiber sheets can be made at any desirable position typically in the width direction of the stacked reinforced-fiber sheets.

Conventional method of shaping has been applied to "T-shaped" and "J-shaped" stringers. However, it has not been applied to "I-shaped" or "H-shaped" stringers such as shown in FIG. 2C. The applicant has improved the conventional method of shaping the J-shaped stringer and, instead of bending the looped end of the stacked reinforced-fiber sheets which protrudes downwardly from the lower surfaces of the side presses by the roller at the end of shaping processes, provided a method of pressing the looped end of the stacked reinforced-fiber sheets upwardly by a flat member (for example, a stopper 6 as shown in FIGS. 9B and 9C) between the lower surfaces of the side presses to shape the "I-shaped" or "H-shaped" stringer.

It has been known that larger cross-sectional area of the tip-end flange portion provides greater strength for the stringer structure if the web portion remains in the same size. From this point of view, it can be said that the "I-shaped" or "H-shaped" stringer has strength equivalent to that of the "J-shaped" stringer. However, the strength of the "J-shaped" stringer shows directivity, since the tip-end flange portion thereof is bent to one direction. Therefore, the "I-shaped" or "H-shaped" stringer is highly versatile due to no directivity in strength and, therefore, it is meaningful to realize the "I-shaped" or "H-shaped" stringer and bring it into the market.

Although it seems to be relatively easy to shape the "I-shaped" or "H-shaped" stringer by the above mentioned method, in fact it has not been made for practical use because of difficulties in making its quality reliable, such as difficulties in spreading the tip-end flange portions equally to the left and right directions.

A method and apparatus for shaping the "I-shaped" or "H-shaped" stringer according to the present invention will be explained in more detail. First, before inserting the punch, a bar-shaped filler may be placed on the stacked reinforced-fiber sheets which are placed on the side presses, along a folding line of the stacked reinforced-fiber sheets at which the stacked reinforced-fiber sheets are supposed to be folded, at a position corresponding to the predetermined gap between the side presses, in many cases preferably at a middle position of the gap since the side presses move identically to each other in opposing directions. Then, similarly to the conventional method, the punch is inserted to fold the stacked reinforced-fiber sheets. Of course, similarly to the shaping of the "J-shaped" stringer, when the punch is inserted, the looped end of the folded stacked reinforced-fiber sheets is assured to protrude downwardly from the lower surfaces of the side presses.

Then, a stopper moves upwardly to engage the looped end of the stacked reinforced-fiber sheets which protrudes downwardly from the lower surfaces of the side presses. The stopper is provided with one or more positioning needles protruding from an upper surface thereof. The positioning needle pierces through the looped end of the stacked reinforced-fiber sheets and then into the filler, when the stopper moves upwardly.

Then, after the punch is extracted, the stopper moves further up to press the looped end of the stacked reinforced-fiber sheets between the lower surfaces of the side presses to spread the looped end to both left and right while the looped end of the stacked reinforced-fiber sheets is being pierced by the positioning needle. Thereby, by disposing the positioning needle at a middle position in the left-and-right direction (in the width direction of the stacked reinforced-fiber sheets), the looped end of the stacked reinforced-fiber sheets can be equally spread to the left and right and, thus, tip-end flange portions with equal widths in the left-and-right direction can be formed.

Preferably, the filler may be arranged on the stacked reinforced-fiber sheets along a folding line (typically, at the middle position in the width direction of the stacked reinforced-fiber sheets if it is to be folded in half). Accordingly, if a conventional shape is utilized for the punch, there might be a possibility of interfering by a pressing surface of the punch with the stacked reinforced-fiber sheets. Thus, it is desirable to provide a recess on the pressing surface of the punch to avoid the interference. The recess may be of a shape to which the filler fits. The filler may be of the same length as the stacked reinforced-fiber sheets and the cross-sectional shape of the filler along a surface perpendicular to the longitudinal direction of the stacked reinforced-fiber sheets may be a shape which fits between plies of the stacked reinforced-fiber sheets between the tip-end flange portions and the web portion, such as a triangular shape.

Since the filler is left in the stacked reinforced-fiber sheets to be folded and may not be removed, it is preferable to provide the filler with the same material as the stacked reinforced-fiber sheets with the resin soaked. In this case, the resin in the filler is melted and mixed with the resin in the stacked reinforced-fiber sheets, and the both materials are unified when they are heat treated to be hardened.

Moreover, the filler may be made to be in a shape such that one side fits to the flat pressing surface of the stopper and other sides fit a connecting portion between the both left-and-right tip-end flange portions and the web portion, it can be readily checked by eyes if the looped-end of the stacked reinforced-fiber sheets is equally spread to the left and right to be the tip-end flange portions, by looking at the end surface of the shaped product in the longitudinal direction.

The above and further objects and features of the invention will more fully be apparent from the following detailed description with accompanying drawings.

BRIEF DESCRIPTION OF THE SEVERAL VIEWS OF THE DRAWINGS

FIG. 2A shows a T-shaped stringer structure, FIG. 2B shows a J-shaped stringer structure, and FIG. 2C shows an I-shaped or H-shaped stringer structure, respectively;

FIG. 5A shows a state where they are bent once, and FIG. 5B shows a state where they are further bent to the other direction, respectively;

FIG. 6A shows a state where they are bent once, and FIG. 6B shows a state where they are further bent to the other direction, respectively;

DETAILED DESCRIPTION OF THE INVENTION

Hereinafter, a method of shaping a section bar made of composite material, an apparatus utilizing the method, and a shaped product as a resultant will be illustrated according to the present invention. As an example of the shaped product, a stringer of a skin-stringer structure will be described referring to the accompanied drawings.

Figure 1:
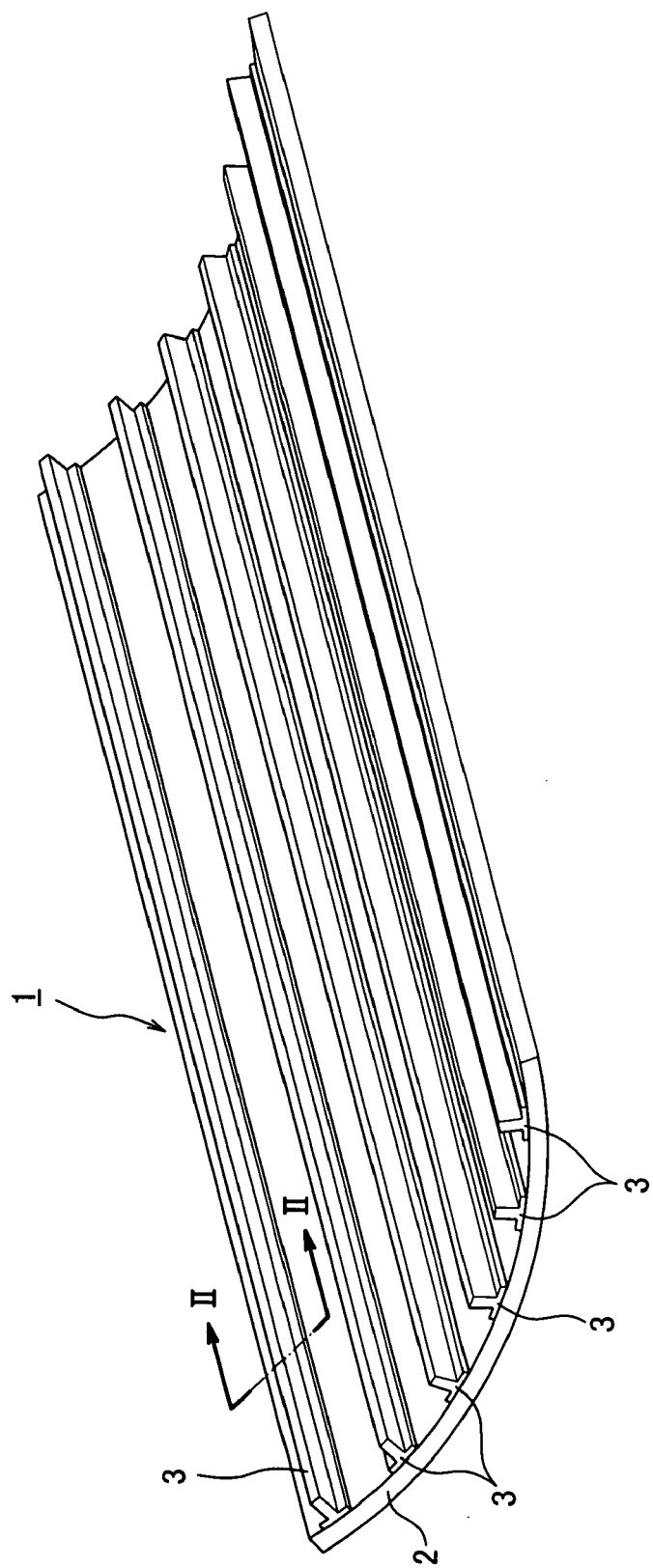
FIG. 1 is a perspective view showing a skin-stringer structure made of composite material utilized for a shell panel of a fuselage or wings of an airplane.
Figure 2A:
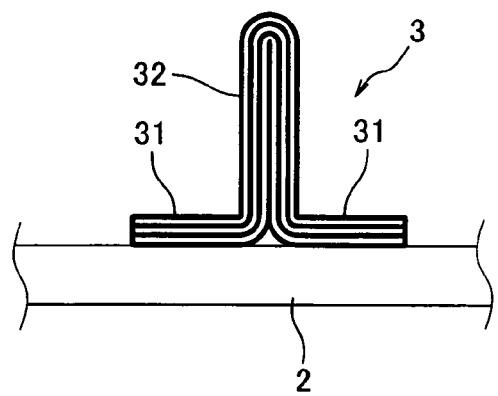
FIGS. 2A–2C are cross-sectional views taken along a line II—II of FIG. 1, showing various stringer shapes, especially.
Figure 2B:
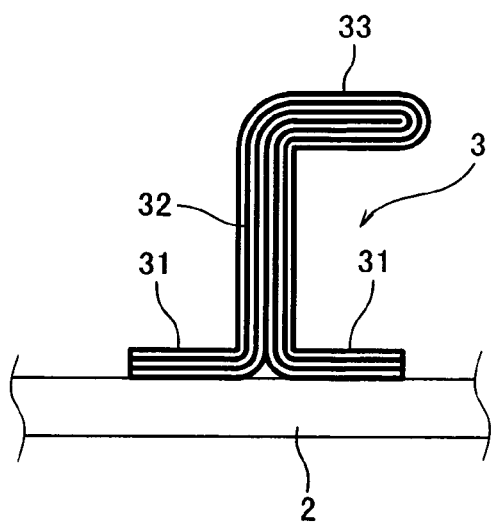
Figure 2C:
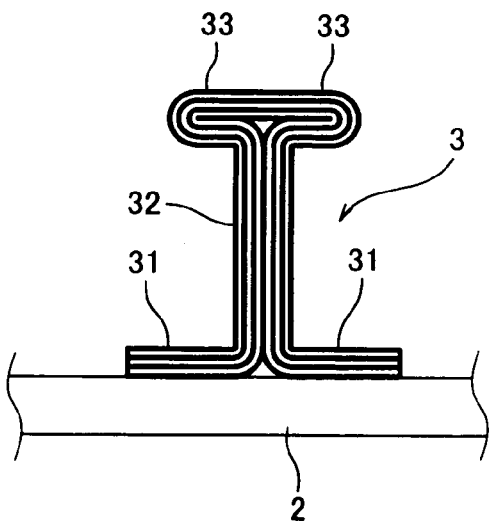
Figure 3A:
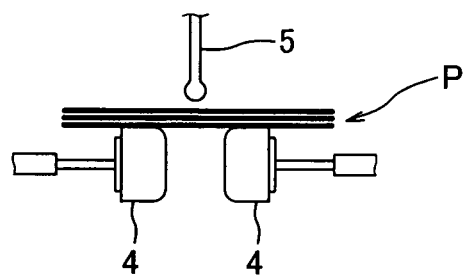
FIGS. 3A through 3D are views for explaining a conventional method of shaping a T-shaped stringer shown in FIG. 2A, and a configuration of an apparatus used for shaping the same.
Figure 3B:
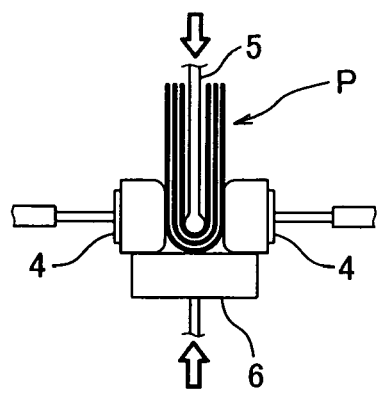
Figure 3C:
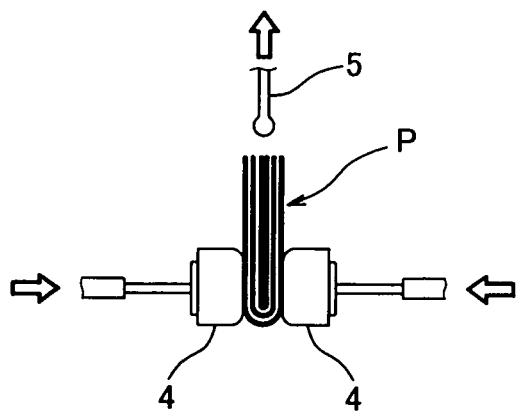
Figure 3D:
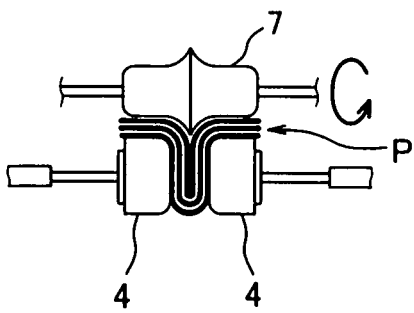
Figure 4A:
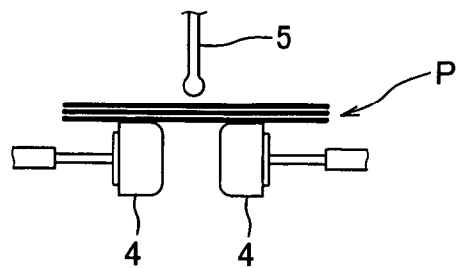
FIGS. 4A through 4D are views for explaining a conventional method of shaping a J-shaped stringer shown in FIG. 2B, and a configuration of an apparatus used for shaping the same.
Figure 4B:
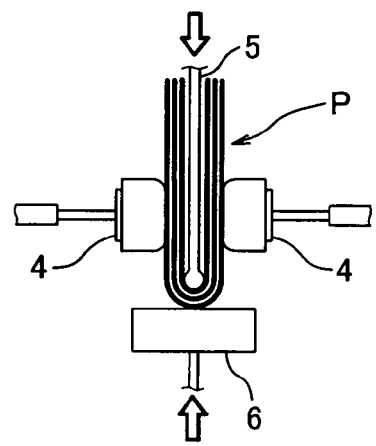
Figure 4C:
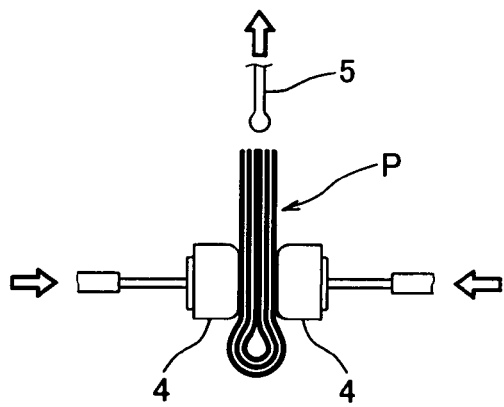
Figure 4D:
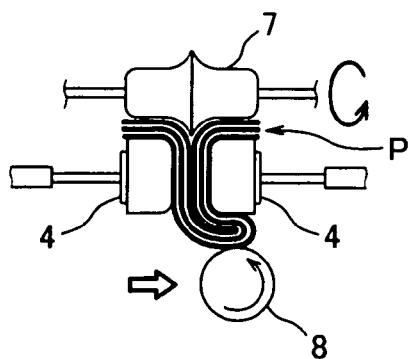
Figure 5A:
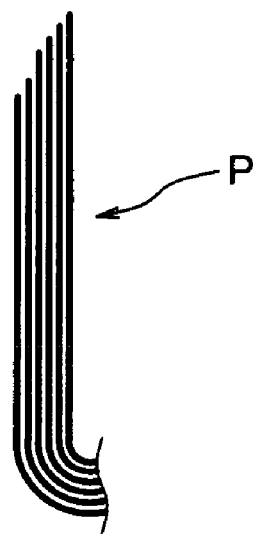
FIGS. 5A and 5B are views for explaining "ideal slippage" between plies of stacked prepreg sheets when they are bent, especially.
Figure 5B:
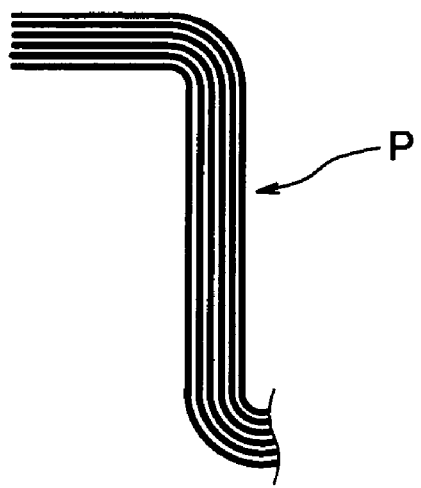
Figure 6A:
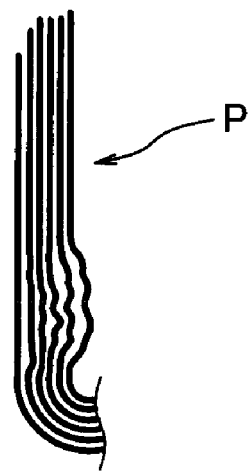
FIGS. 6A and 6B are views for explaining "fluctuation" resulted in "actual slippage" between plies of stacked prepreg sheets when they are bent, especially.
Figure 6B:
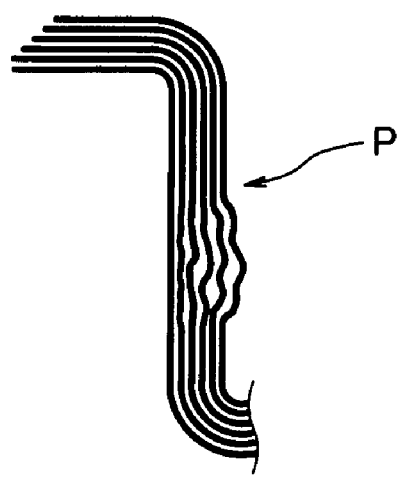

As shown in FIG. 1, a stringer 3 of this embodiment is hardened (for example, by heat) together with a skin 2 and, finally, formed to be a skin-stringer structure 1. The stringer 3 and skin 2 are made of the same material, such as prepreg. According to a shaping method of the present invention, a "T-shaped" stringer (see FIG. 2A) and a "J-shaped" stringer (see FIG. 2B) with substantially the same shapes as from a conventional method can be shaped, as well as an "I-shaped" or "H-shaped" stringer (see FIG. 2C).

Next, the shaping methods of the T-shaped, J-shaped, and I-shaped or H-shaped stringers will be explained in detail, referring to FIGS. 7A through 7C, FIGS. 8A through 8D, and FIGS. 9A through 9C, respectively.

Figure 7A:
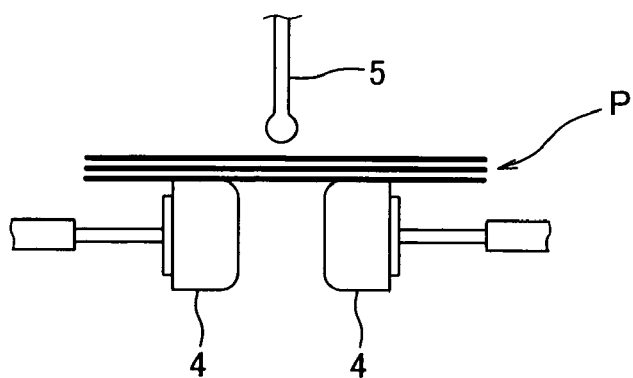
FIGS. 7A through 7C are views for explaining a method of shaping a T-shaped stringer shown in FIG. 2A according to an embodiment of the present invention, and a configuration of an apparatus used for shaping the same.

First, in forming the T-shaped stringer, as shown in FIG. 7A, stacked prepreg sheets P of two or more plies before hardening treatment are placed on upper surfaces of a pair of side presses 4. The prepreg sheets are each constituted of a number of UD or Uni-Directional prepreg fibers, and the prepreg fibers are oriented to the front-and-rear direction, which is perpendicular to the drawing paper. The side presses 4 are press machines with their width extending along the entire length of the prepreg fibers in the front-and-rear direction, and arranged facing each other so as to be able to press the stacked prepreg sheets P between mold portions with a corresponding stringer shape, provided at opposing ends of the side presses 4. The side presses 4 are spaced apart with a predetermined gap larger than a thickness of a web portion of the stringer to be yielded. A punch 5 is disposed above the mold portions of the side presses 4 so as to move vertically between the mold portions. The punch 5 also has a width extending along the entire length of the prepreg fibers in the front-and-rear direction.

Figure 7B:
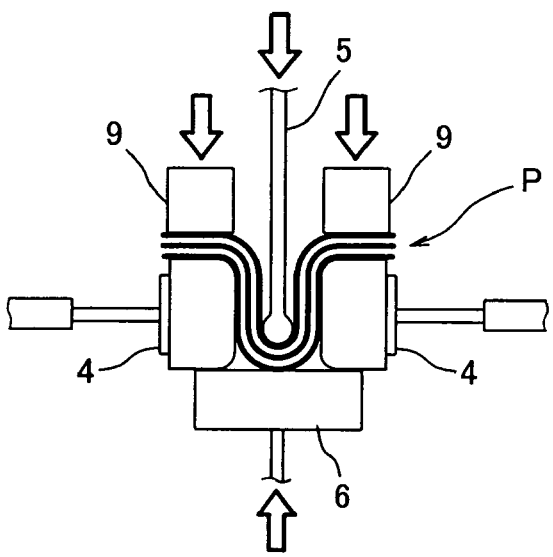

As shown in FIG. 7B, while the side presses 4 are maintaining the gap, the punch 5 moves downwardly and then pushes the stacked prepreg sheets P at the center in the width direction thereof (i.e., in the left-and-right direction of the drawing) to fold the stacked prepreg sheets P in half, with the punch 5 being pressed through the gap between the side presses 4. At the same time, a stopper 6, which is provided below the gap so as to move vertically, moves upwardly and then stops at lower surfaces of the side presses 4. Therefore, the stacked prepreg sheets P are stopped at upper surface of the stopper 6, and do not protrude downwardly from the lower surfaces of the side presses 4.

At the same time, two block members 9 provided above each of the side presses 4, respectively, move downwardly and then press both ends of the stacked prepreg sheets P in the width direction against the upper surfaces of the side presses 4 such that they pinch the stacked prepreg sheets P only lightly. In this condition, the pressing force of the block members 9 causes the ends of the stacked prepreg sheets P in the width direction not being raised upwardly when the punch 5 is inserted. However, at the same time, the pressing force allows the stacked prepreg sheets P to slip between the block members 9 and side presses 4 because the stacked prepreg sheets P have a characteristic of elongating minimally in the width direction and, thus, the insertion of the punch 5 would not be interrupted by the pressing force of the block members 9.

Furthermore, in this stage, base-end flange portions of the stringer are simultaneously formed. That is, a difference in curve lengths between at the outermost prepreg sheet layer and the innermost prepreg sheet layer of the stacked prepreg sheets P produced when folded in half can be cancelled by further forming the base-end flange portions so as to bend to opposite directions, respectively. Therefore, a high-quality shaped product without "fluctuation" being produced between plies of the stacked prepreg sheets P can be provided. It can be readily appreciated by those skilled in the art that this principle of the invention can be applied to any bending conditions as long as the sum of the total bending or folding angles is zero.

In this embodiment, although the total of two block members 9 are arranged corresponding to each of the side presses 4, the block members 9 may be integrally formed if there is no interference with the punch 5. Of course, more than two block members may also be provided.

Figure 7C:
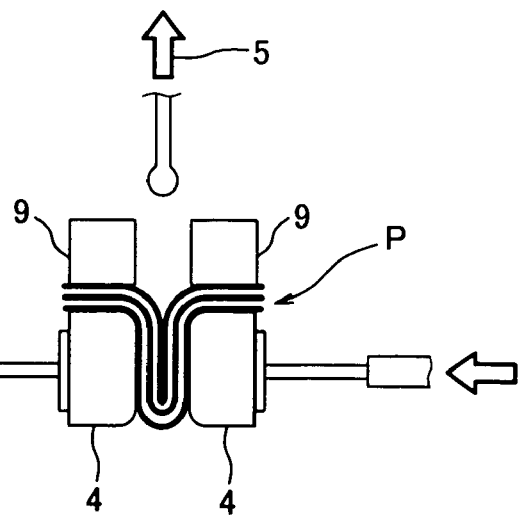

Then, as shown in FIG. 7C, the punch 5 is moved upwardly and extracted from the stacked prepreg sheets P which are folded in half. For this process, the punch 5 is formed so as to be enlarged at only a tip portion thereof and, thus, the punch 5 is hardly influenced by frictional resistance of the resin in the stacked prepreg sheets P, which are sandwiching the punch 5. When the punch 5 is extracted, while maintaining the pressing state by the block members 9, the side presses 4 press the half-folded stacked prepreg sheets P by a predetermined pressing force to form a web portion of the stringer with a doubled thickness (i.e., a doubled number of plies) of the original stacked prepreg sheets P and, therefore, form a T-shaped stringer.

In order to adjust a height of the web portion of the T-shaped stringer, a central portion of the stopper 6 (a portion being in contact with the stacked prepreg sheets P) may be of a convex shape, or the stopper 6 may be stopped at a position spaced apart from the lower surfaces of the side presses 4.

Figure 8A:
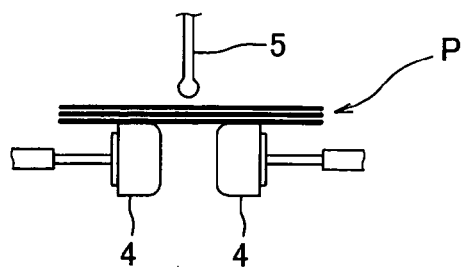
FIGS. 8A through 8D are views for explaining a method of shaping a J-shaped stringer shown in FIG. 2B according to another embodiment of the present invention, and a configuration of an apparatus used for shaping the same.

Next, in forming the J-shaped stringer, as shown in FIG. 8A, stacked prepreg sheets P of two or more plies before hardening treatment are placed on upper surfaces of a pair of side presses 4.

Figure 8B:
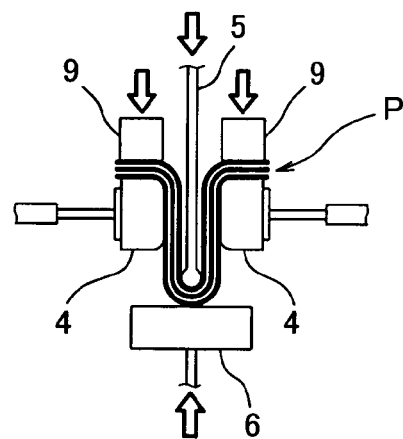

Subsequently, as shown in FIG. 8B, while the side presses 4 are maintaining the gap, the punch 5 moves downwardly and then pushes the stacked prepreg sheets P at the center in the width direction thereof (i.e., in the left-and-right direction of the drawing) to fold the stacked prepreg sheets P in half, as the punch 5 is being pressed through the gap between the side presses 4. At the same time, a stopper 6, which is provided below the gap so as to move vertically, moves upwardly, and then stops at a position spaced apart from the lower surfaces of the side presses 4 by a predetermined distance. Therefore, the stacked prepreg sheets P are stopped at an upper surface of the stopper 6 with the lower end (closed end) protruding downwardly from the lower surfaces of the side presses 4 by the predetermined distance.

At the same time, two block members 9 provided above each of the side presses 4, respectively, move downwardly and then press both ends of the stacked prepreg sheets P in the width direction against the upper surfaces of the side presses 4 such that they pinch the stacked prepreg sheets P only lightly. In this condition, the pressing force of the block members 9 causes the ends of the stacked prepreg sheets P in the width direction not to be raised upwardly when the punch 5 is inserted. However, at the same time, the pressing force allows the stacked prepreg sheets P slip between the block members 9 and side presses 4 because the stacked prepreg sheets P has a characteristic of elongating only slightly in the width direction and, thus, the insertion of the punch 5 would not be interrupted by the pressing force of the block members 9.

Furthermore, in this stage, base-end flange portions of the stringer are formed at the same time. That is, a difference in curve lengths between the outermost prepreg sheet layer and the innermost prepreg sheet layer of the stacked prepreg sheets P is produced when bent in half can be cancelled by further forming the base-end flange portions so as to bend to opposite directions, respectively. Therefore, a high-quality shaped product without "fluctuation" being produced between plies of the stacked prepreg sheets P can provided.

Figure 8C:
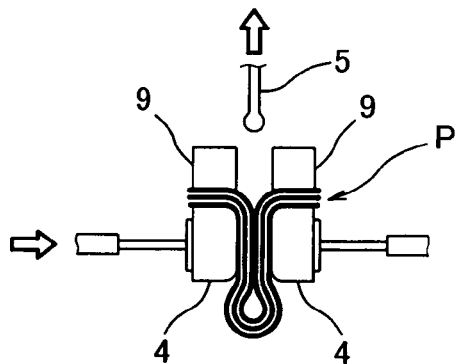

Then, as shown in FIG. 8C, the punch 5 is moved upwardly and extracted from the stacked prepreg sheets P which are folded in half. When the punch 5 is extracted, while maintaining the pressing state by the block members 9, the side presses 4 press the half-folded stacked prepreg sheets P by a predetermined pressing force to form a web portion of the stringer with a doubled thickness (i.e., a doubled number of plies) of the original stacked prepreg sheets P.

Figure 8D:
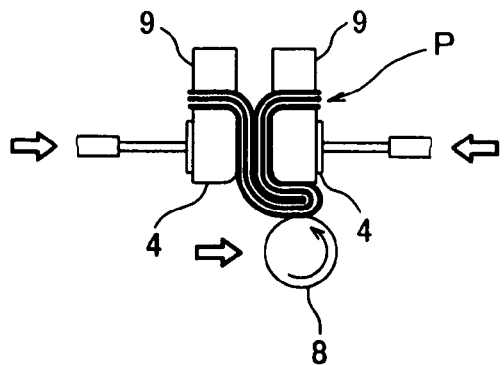

Furthermore, as shown in FIG. 8D, a roller 8 traverses from left to right (or right to left) along the lower surfaces of the side presses 4 so that it bends the looped or closed end of the half-folded stacked prepreg sheets P to the right while it presses the closed end between the lower surface of the right-side side press 4 and, therefore, forms a J-shaped stringer.

Figure 9A:
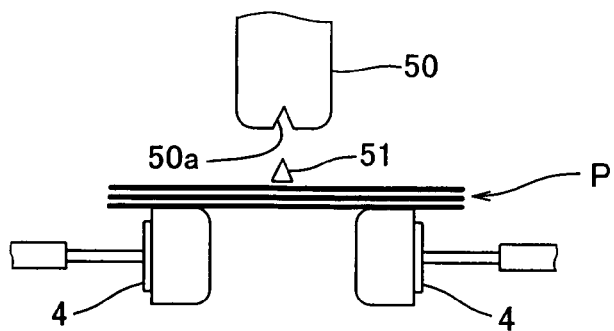
FIGS. 9A through 9C are views for explaining a method of shaping of an I-shaped or H-shaped stringer shown in FIG. 2C according to still another embodiment of the present invention, and a configuration of an apparatus used for shaping the same.

Next, in forming the I-shaped or H-shaped stringer, as shown in FIG. 9A, stacked prepreg sheets P of two or more plies before hardening treatment are placed on upper surfaces of a pair of side presses 4. This forming apparatus of I-shaped or H-shaped stringer is provided with a punch 50. The punch 50 is provided with a groove portion 50a of a triangular cross-section formed at a center in the width direction (left-and-right direction in this figure) on a tip end surface (i.e., lower end surface) thereof. The groove portion 50a extends in the longitudinal direction of the stacked prepreg sheets P. A bar-shaped filler 51 extending in the longitudinal direction of the stacked prepreg sheets P is placed on upper surface of the stacked prepreg sheets P at the center in the width direction. The filler 51 is of a triangular cross-section which fits to the groove portion 50a of the punch 50, and is oriented such that one of its corners is on top.

In this embodiment, this filler 51 is formed from the same prepreg material as the stacked prepreg sheets P used as a mother material, and is oriented in the longitudinal direction of the stacked prepreg sheets P. Since the filler 51 is made of the same material as the mother material, resins in both material are melted and mixed, and then both materials are unified by heat at a time of hardening after shaping processes.

Figure 9B:
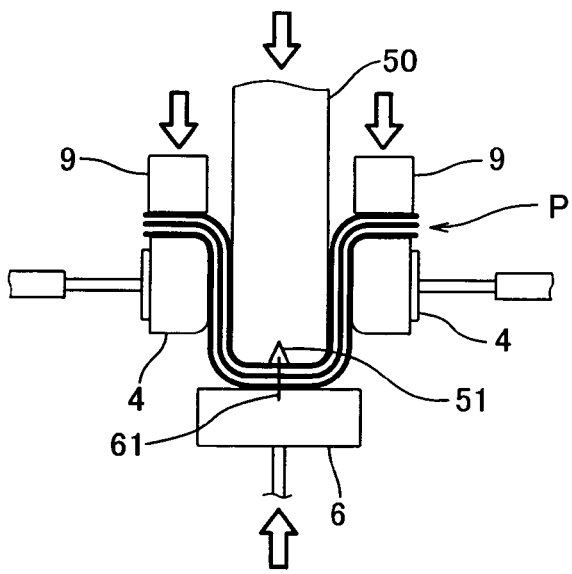

Subsequently, as shown in FIG. 9B, while the side presses 4 are maintaining the gap, the punch 50 moves downwardly and, then, pushes the stacked prepreg sheets P at the center in the width direction thereof (i.e., in the left-and-right direction of the drawing) to fold the stacked prepreg sheets P in half, as the punch 50 being pressed through the gap between the side presses 4. At the same time, the filler 51 fits into the groove portion 50a of the punch 50a to align the stacked prepreg sheets P in position while frictionally engaging with the filler 51 held in the groove portion 50a.

At the same time, two block members 9 provided above each of the side presses 4, respectively, move downwardly and then press both ends of the stacked prepreg sheets P in the width direction against the upper surfaces of the side presses 4 such that they pinch the stacked prepreg sheets P only lightly. In this condition, the pressing force of the block members 9 causes the ends of the stacked prepreg sheets P in the width direction not to be raised upwardly when the punch 50 is inserted However, at the same time, the pressing force allows the stacked prepreg sheets P slip between the block members 9 and side presses 4 because the stacked prepreg sheets P has a characteristic of hardly elongating in the width direction and, thus, the insertion of the punch 50 would not be interrupted by the pressing force of the block members 9.

Furthermore, in this stage, base-end flange portions of the stringer are formed at the same time. That is, a difference in curve lengths between at the outermost prepreg sheet layer and the innermost prepreg sheet layer of the stacked prepreg sheets P produced when bent in half can be cancelled by further forming the base-end flange portions so as to bend to opposite directions, respectively. Therefore, a high-quality shaped product without "fluctuation" being produced between plies of the stacked prepreg sheets P can be provided.

At the same time, a stopper 6, which is provided below the gap so as to move vertically, moves upwardly and then stops at a position spaced apart from the lower surfaces of the side presses 4 by a predetermined distance. Therefore, the stacked prepreg sheets P are stopped at an upper surface of the stopper 6 with the lower end (closed end) protruding downwardly from the lower surfaces of the side presses 4 by the predetermined distance.

In this embodiment, at the center of the upper surface of the stopper 6 in the width direction, a positioning needle 61 (typically, two or more positioning needles 61 may be disposed at a predetermined interval in the longitudinal direction of the stopper 6, that is, in the front-and-rear direction in the figure) protrudes upwardly. The positioning needle 61 penetrates through the looped end of the stacked prepreg sheets P as the stopper 6 being raised and then reaches halfway in the filler 51. Thus, the positioning needle 61 secures the half-folded stacked prepreg sheets P to assist the looped or closed end of the stacked prepreg sheets P, which protrudes downwardly from the lower surfaces of the side presses 4, equally spread to both left and right.

A residual hole that is produced in the stacked prepreg sheets P by piercing the positioning needle 61 into the prepreg sheets P, is filled in with the melted resin of the stacked prepreg sheets P, prior to hardening after the shaping processes.

Figure 9C:
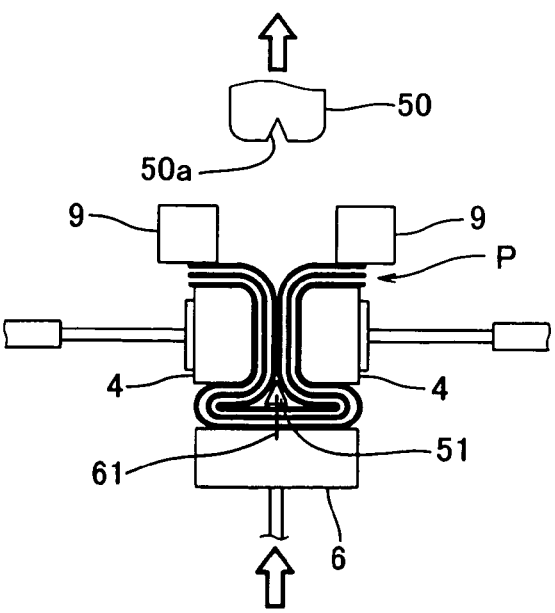

Then, as shown in FIG. 9C, the punch 50 is moved upwardly and extracted from the stacked prepreg sheets P which are folded in half. When the punch 50 is extracted, while maintaining the pressing state by the block members 9, the side presses 4 press the half-folded stacked prepreg sheets P by a predetermined pressing force to form a web portion of the stringer with a doubled thickness (i.e., a doubled number of plies) of the original stacked prepreg sheets P. The stopper 6 then further moves upward, and presses the looped or closed end of the stacked prepreg sheets P, which protrudes downwardly from the lower surfaces of the side presses 4, between the lower surfaces of the side presses 4. The stopper 6 presses the looped or closed end of the stacked prepreg sheets P together with the filler 51 therein, and spreads the looped or closed end of the stacked prepreg sheets P equally to left and right, while maintaining the filler 51 at the center of looped or closed end of the stacked prepreg sheets P by the positioning needle 61 and, thus, tip-end flange portions of the stringer are formed.

Figure 10:
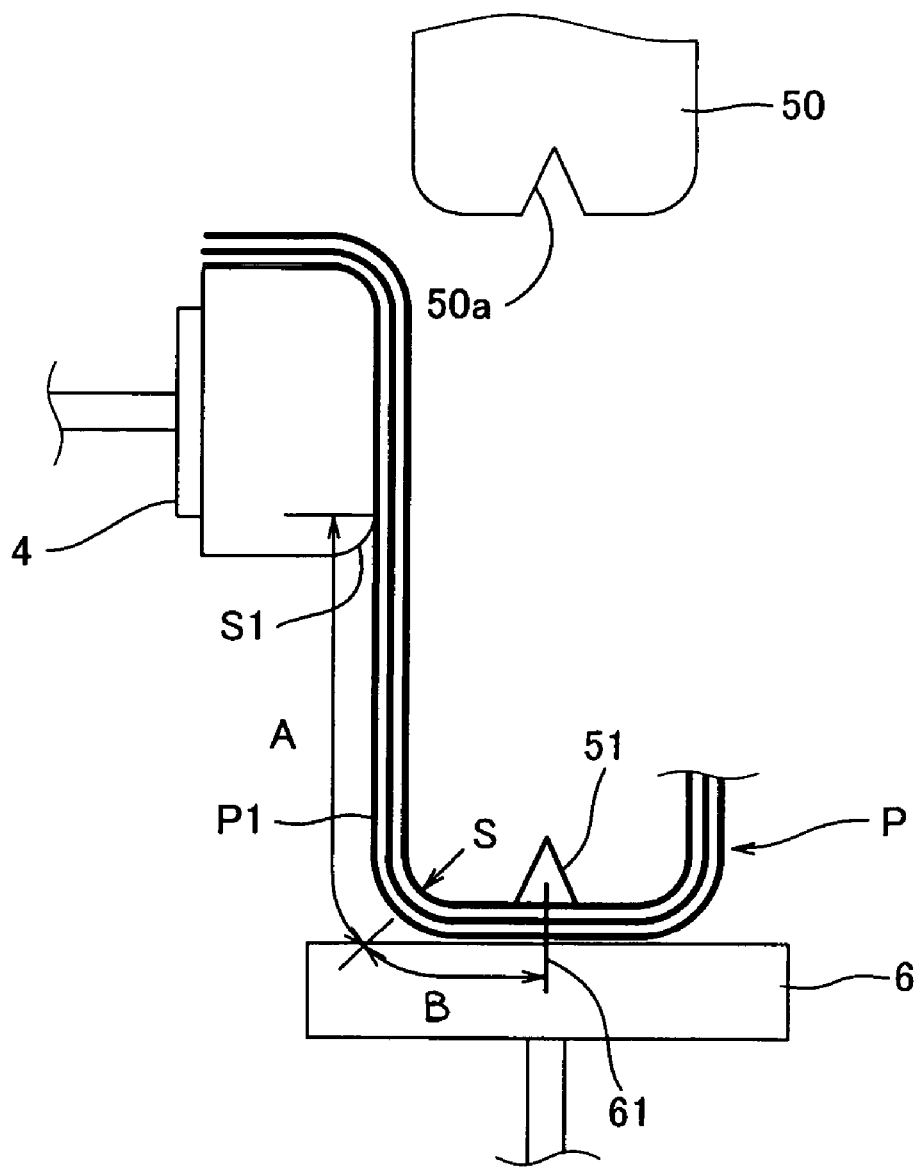
FIG. 10 is a view showing a detailed configuration of the apparatus for shaping the I-shaped or H-shaped stringer shown in FIGS. 9A through 9C.

In the forming method and apparatus for the I-shaped or H-shaped stringer, as shown in FIG. 10, if a dimensional relationship of "A=B" is satisfied, bending of the stacked prepreg sheets P around a corner S of the punch 50 can be made and, thus, "fluctuation" would not be generated in the stacked prepreg sheets P.

The dimension A represents a dimension along an outer surface of the outermost layer prepreg sheet P1 (i.e., an exposed layer other than a layer or layers to be attached to the skin 2) among the two or more plies of the stacked prepreg sheets, from a boundary between a flat pressing surface of the side press 4 and a lower corner portion S1 of the side press 4 below the pressing surface to a center of the corner portion S continuing below a linear section to be a web portion of the outermost layer prepreg sheet P1 extending below the side presses 4. The dimension B represents a dimension along an outer surface of the outermost layer prepreg sheet P1, from the center of the corner portion S1 to a position of the positioning needle 61.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

The invention claimed is:

1. A method of shaping a section bar by bending stacked reinforced-fiber sheets of two or more plies with resin soaked therein, comprising the steps of:
    placing the stacked reinforced-fiber sheets on a pair of side presses opposed to each other with a predetermined gap;
    placing a bar-shaped filler along a folding line of the stacked reinforced-fiber sheets;
    inserting a punch through the gap from above to fold the stacked reinforced-fiber sheets, while holding ends of the stacked reinforced-fiber sheets between upper surfaces of the side presses by block members, and, during the step of inserting the punch, engaging a stopper upwardly with a looped end of the folded stacked reinforced-fiber sheets which protrudes downwardly from lower surfaces of the side presses while piercing a positioning needle which protrudes from an upper surface of the stopper through the looped end and then into the filler;
    drawing out the punch upward and, then, pressing the folded stacked reinforced-fiber sheets by the side presses therebetween; and
    pressing the stopper against the looped end between the lower surfaces of the side presses while the positioning needle pierces the looped end, to spread the looped end to both left-and-right.

2. The method of claim 1, wherein the punch is provided with a recess formed in a corresponding position thereof with which the filler engages, in a shape such that the filler fits thereto.

3. The method of claim 1, wherein the filler is of a triangular cross-section.

4. The method of claim 1, wherein the filler is made of the same material as that of the stacked reinforced-fiber sheets with the resin soaked.

5. The method of claim 1, wherein the side presses have opposing flat pressing surfaces, and the punch includes corner portions below each of the flat pressing surfaces, and
    wherein the step of inserting the punch includes making a first dimension and a second dimension along an outermost ply surface of the stacked reinforced-fiber sheets equal, and
    the first dimension is from a lower end of the flat surface of each of the side presses to a middle of the corner portion below the corresponding side press, and the second dimension is from the middle of the corner portion to a position pierced by the positioning needle.

* * * * *